United States Patent
Prabhakar et al.

(10) Patent No.: US 12,164,970 B2
(45) Date of Patent: *Dec. 10, 2024

(54) SCALING VIRTUALIZATION RESOURCE UNITS OF APPLICATIONS

(71) Applicant: Cohesity, Inc., San Jose, CA (US)

(72) Inventors: Venkatesh Prabhakar, Saratoga, CA (US); Sachin Jain, Fremont, CA (US); Anubhav Gupta, Sunnyvale, CA (US); Anirvan Duttagupta, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,173

(22) Filed: Jul. 31, 2023

(65) Prior Publication Data

US 2023/0376357 A1    Nov. 23, 2023

Related U.S. Application Data

(63) Continuation of application No. 17/227,108, filed on Apr. 9, 2021, now Pat. No. 11,755,384, which is a continuation of application No. 16/456,367, filed on Jun. 28, 2019, now Pat. No. 11,003,504.

(51) Int. Cl.
| G06F 9/50 | (2006.01) |
| G06F 9/455 | (2018.01) |
| G06F 9/48 | (2006.01) |

(52) U.S. Cl.
CPC ........ *G06F 9/5077* (2013.01); *G06F 9/45558* (2013.01); *G06F 9/4881* (2013.01); *G06F 9/5038* (2013.01); *G06F 2009/4557* (2013.01)

(58) Field of Classification Search
CPC .. G06F 9/5077; G06F 9/45558; G06F 9/4881; G06F 9/5038; G06F 2009/4557
See application file for complete search history.

(56) References Cited

U.S. PATENT DOCUMENTS

| 8,566,835 | B2 | 10/2013 | Wang |
| 9,003,019 | B1 | 4/2015 | Guo |
| 9,805,345 | B1 | 10/2017 | Dailianas |
| 10,176,550 | B1 | 1/2019 | Baggerman |

(Continued)

OTHER PUBLICATIONS

Prosecution History from U.S. Appl. No. 16/456,367, now issued U.S. Pat. No. 11,003,504, dated Sep. 18, 2019 through Feb. 10, 2021, 136 pp.

(Continued)

*Primary Examiner* — Wissam Rashid
(74) *Attorney, Agent, or Firm* — Shumaker & Sieffert, P.A.

(57) ABSTRACT

A request to launch an application that is comprised of a plurality of layers is received. Each layer of the plurality of layers of the application is comprised of one or more corresponding virtualization resource units. The one or more corresponding virtualization resource units at each of the plurality of layers of the application is expressed as a resource ratio. It is determined that a surplus of resources is available for one or more applications. In response to determining that the surplus of resources is available for one or more applications, a priority associated with the application is determined. A version of the application is launched based on the determined priority associated with the application. The launched version of the application maintains the resource ratio.

20 Claims, 10 Drawing Sheets

(56) References Cited

U.S. PATENT DOCUMENTS

| | | |
|---|---|---|
| 11,003,504 B2 | 5/2021 | Prabhakar et al. |
| 11,755,384 B2 | 9/2023 | Prabhakar et al. |
| 2009/0016220 A1 | 1/2009 | Uysal |
| 2011/0131589 A1 | 6/2011 | Beaty |
| 2011/0161973 A1 | 6/2011 | Klots |
| 2014/0026122 A1 | 1/2014 | Markande |
| 2014/0058871 A1 | 2/2014 | Marr |
| 2014/0200839 A1 | 7/2014 | Doi |
| 2019/0280932 A1 | 9/2019 | Gazzetti |

OTHER PUBLICATIONS

Prosecution History from U.S. Appl. No. 17/227,108, now issued U.S. Pat. No. 11,755,384, dated Jun. 21, 2021 through Aug. 4, 2023, 39 pp.

SCALING VIRTUALIZATION RESOURCE UNITS OF APPLICATIONS

CROSS REFERENCE TO OTHER APPLICATIONS

This application is a continuation of U.S. patent application Ser. No. 17/227,108, entitled SCALING VIRTUALIZATION RESOURCE UNITS OF APPLICATIONS filed Apr. 9, 2021, which is a continuation of U.S. patent application Ser. No. 16/456,367, now U.S. Pat. No. 11,003,504, entitled SCALING VIRTUALIZATION RESOURCE UNITS OF APPLICATIONS filed Jun. 28, 2019, each of which is incorporated herein by reference for all purposes.

BACKGROUND OF THE INVENTION

A virtualization container may be comprised of an application, the dependencies of the application, libraries, one or more other binaries, and configuration files needed to run the application. The application running in the virtualization container may be one part of a larger application, where each part of the larger application is running on a corresponding virtualization container. The plurality of virtualization containers that comprise the larger application may be deployed to one or more computing environments.

BRIEF DESCRIPTION OF THE DRAWINGS

Various embodiments of the invention are disclosed in the following detailed description and the accompanying drawings.

DETAILED DESCRIPTION

Figure 1:
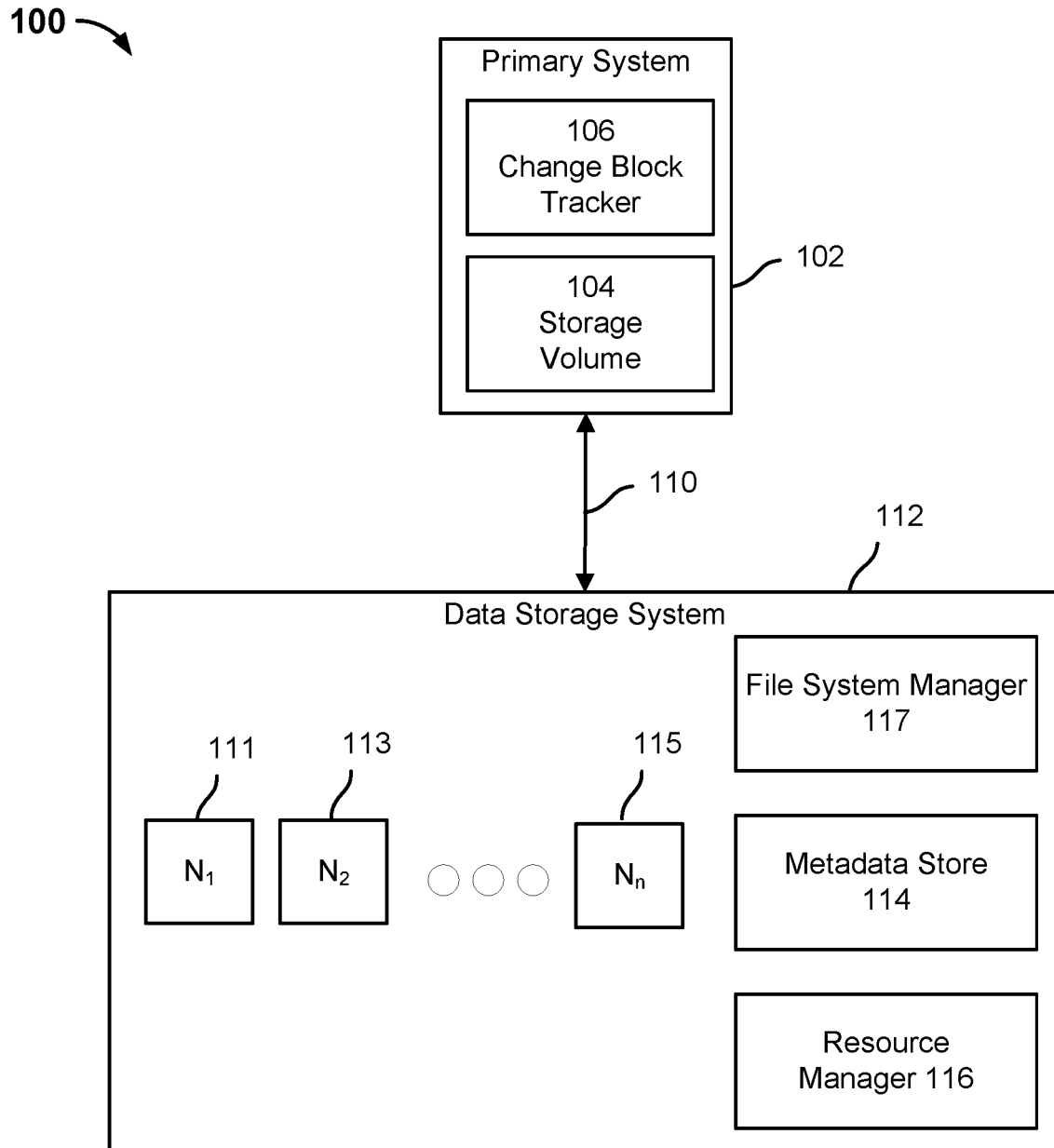
FIG. 1 is a block diagram illustrating a system for scaling applications in accordance with some embodiments.

An application may be stored on a data storage system as a set of container images. When the application is executed by the data storage system, the application may be comprised of one or more layers where each layer is comprised of one or more virtualization containers. For example, an application may be comprised of three layers. The first layer of the application may be comprised of one virtualization container, the second layer of the application may be comprised of two virtualization containers, and the third layer of the application may be comprised of one virtualization container. The number of virtualization containers at each layer may be expressed using a resource ratio. For example, an application comprised of a first layer having one virtualization container, a second layer having two virtualization containers, and a third layer having one virtualization container has a resource ratio of 1:2:1.

An application developer may specify the resource ratio and the one or more container types associated with each layer of the application. The application developer may also specify a default amount of resources needed to run the application. The default amount of resources may be the minimum amount of resources needed to run the application. The specified default amount of resources may include a default amount of memory needed to run the application, a default amount of CPUs needed to run the application, a default amount of input/output operations per second (IOPS) needed to run the application, etc. The default amount of resources may be specified for each virtualization container associated with the application and/or for the application as a whole. In some embodiments, the default amount of resources may be the amount of resources needed to meet certain performance metrics for the application. The application developer may also specify a maximum amount of resources that may be allocated for the application. The maximum amount of resources may be specified for each virtualization container associated with the application and/or for the application as a whole.

An application, beyond one or more core functionalities of a data storage system, may be deployed to the data storage system. Examples of applications include, but are not limited to, a data analytics application, an anti-virus application, a malicious software detection application, a search application, etc. An application may be a third party application that is downloaded from an application store and installed on the data storage system. In some embodiments, an application is not pre-installed on the data storage system before the data storage system is provided to a user. The user associated with the data storage system may select one or more applications to be downloaded and installed to the data storage system after the data storage system has been provided to the user.

The data storage system may be configured to run one or more core functionalities. A core functionality may be part of the data storage system infrastructure that is pre-installed on the data storage system before the data storage system is provided to the user. For example, the one or more core functionalities of the data storage system may include data backup, data restoration, data replication, data archival, storage filer, operating system, infrastructure needed to execute one or more applications (e.g., hypervisor, container infrastructure), etc. The data storage system has a total amount of available resources. A portion of the total amount of available resources may be reserved for the one or more core functionalities. The portion of the total amount of available resources reserved for the one or more core functionalities may vary over time depending upon the resource needs of the one or more core functionalities. The total amount of available resources less the amount of resources reserved for one or more core functionalities may be the amount of resources available to operate the one or more applications.

System resource utilizations by the one or more core functionalities of the data storage system may be monitored. The one or more core functionalities of the data storage system may be given resource priority over the one or more applications. The data storage system may be configured to allocate resources such that the data storage system is able to perform the one or more core functionalities and to provide the corresponding default amount of resources needed to run the one or more applications. In some embodiments, the data storage system has a surplus of resources to allocate to the one or more applications (e.g., additional resources in excess of the default amount of resources allocated to the one or more applications). For example, the one or more core functionalities may be consuming less than the amount of resources reserved for the one or more core functionalities. The data storage system may re-allocate the surplus of resources to the one or more applications.

The data storage system may be comprised of one or more storage nodes. In some embodiments, the one or more storage nodes are physical storage nodes. Each storage node may have a corresponding processor and be comprised of one or more storage tiers of storage (e.g., one or more solid state drives (SSDs) and/or one or more hard disk drives (HDDs)). The data storage system may be configured to back up data from a primary system. The one or more applications may be configured to run one or more processes on the data that is backed up from the primary system to the data storage system. In some embodiments, the one or more applications are configured to run one or more processes on the data that is generated on or by the data storage system. In some embodiments, the one or more applications may be configured to run as a background process on the data storage system. In other embodiments, the data storage system is comprised of one or more virtual storage nodes that are operating in a cloud environment (e.g., public cloud, private cloud). Each virtual storage node may have a corresponding amount of storage.

Additional resources may be provisioned for an application to improve a performance of the application. However, merely provisioning additional resources to an application may cause the application to experience problems, such as suboptimal operation or an inefficient usage of resources. An application may be comprised of one or more layers where each layer is comprised of one or more virtualization containers. The data storage system may have additional resources to add an additional virtualization container to one of the application layers. However, adding an additional virtualization container to one of the application layers may create bottlenecks within the application. For example, an application may be comprised of three layers and have a resource ratio of 1:2:1. Additional resources may be provided such that the resource ratio is 1:3:1. The second layer of virtualization containers may process data at such a rate that the virtualization container of the third layer is unable to maintain the rate at which it processes data. In some embodiments, adding an additional virtualization container to one of the virtualization container layers without adding virtualizations containers to the other virtualization container layers may cause the application to stop working.

Additional resources may be provisioned to an application based on the resource ratio. A certain amount of resources is needed to scale the number of virtualization containers of the application to a multiple of the resource ratio. For example, the application may have a resource ratio of 1:2:1 and the number of virtualization containers of the application may be scaled to 2:4:2, 3:6:3, . . . , n:2n:n. The amount of resources needed to scale the number of virtualization containers of the application to a multiple of the resource ratio may be compared to the surplus of resources associated with the data storage system. In the event the amount of resources needed to scale the number of virtualization containers of the application to a multiple of the resource ratio is less than the surplus of resources associated with the data storage system, additional resources may be provisioned to the application. The amount of resources needed to scale a first application may be different than the amount of resources needed to scale a second application.

Other factors may be considered by the data storage system when determining whether to provision additional resources to an application. For example, the data storage system may provision resources for an application based on an amount of data associated with the application. An application may only process jpeg data. The data storage system may store jpeg files occupying a small amount of storage (e.g., less than 100 MB of jpeg files). Even though additional resources may be provisioned to the application, a resource manager of the data storage system may decide against provisioning additional resources to the application because the improvement in performance of the application is negligible (e.g., performance doesn't improve more than a threshold amount). The additional resources that may be provisioned for the application may be provisioned to a different application. In some embodiments, the data storage system may store jpeg files occupying a large amount of storage (e.g., more than 1 TB of jpeg files). The data storage system may provision additional resources to the application when they become available to help the application process jpeg files faster because the improvement in performance of the application is non-negligible (e.g., performance improves more than a threshold amount). The plurality of files stored by the data storage system may be tagged with a file type. The data storage system may use the file type tags to determine the amount of data of particular type stored by the data storage system, to determine the amount of data to be processed by the application, and to determine whether provisioning additional resources for the application results in a non-negligible improvement in a performance of the application. In some embodiments, a user associated with the data storage system specifies an amount of resources that may be provisioned for an application. The user associated with the storage system may indicate that an application is not to be scaled up in the event a surplus of resources exists (e.g., because the improvement in performance is not greater than a threshold amount). In some embodiments, the one or more applications are scaled up or scaled down based on an amount of latency associated with the data storage system.

Resources may be provisioned to one or more applications based on a schedule associated with the one or more core functionalities of the data storage system. One or more core functionalities may be scheduled to be performed at a particular time. The data storage system can estimate the amount of resources that the one or more core functionalities will need at the particular time. In the event the data storage system is able to perform the one or more core functionalities associated with the data storage system at the particular time, the data storage system may provision the remaining resources for one or more applications.

Using a resource ratio to scale up virtualization containers associated with an application may not only ensure that the application will process data faster, but also may ensure that the application is able to properly function. Furthermore, providing the one or more core functionalities of a data storage system with resource priority over the one or more application may ensure that the one or more core functionalities of the data storage system are not disrupted from properly functioning.

FIG. 1 is a block diagram illustrating a system for scaling applications in accordance with some embodiments. In the example shown, system 100 includes a primary system 102 coupled to data storage system 112 via connection 110. Connection 110 may be a wireless or wired connection.

Connection 110 may be a LAN, WAN, intranet, the Internet, and/or a combination thereof.

Primary system 102 is a computing system that is configured to store a plurality of files in one or more volumes 104. Primary system 102 may be comprised of one or more servers, one or more computing devices, one or more storage devices, and/or a combination thereof. Primary system 102 may include change block tracker 106. The file system data stored on primary system 102 is comprised of one or more data blocks. Change block tracker 106 may be configured to monitor the one or more data blocks and store an indication of when one of the one or more data blocks has been modified. Change block tracker 106 may receive one or more data blocks associated with one or more files in route to being stored in the one or more volumes 104 of primary system 102. A change block tracker may be configured to maintain a map of the one or more changes to the file system data. The map may include the one or more data blocks that were changed, the values associated with the one or more changed data blocks, and an associated timestamp. In the event primary system 102 performs a backup snapshot (either full or incremental), change block tracker 106 may be configured to clear (e.g., empty) the map of the one or more data blocks that have been modified.

Data storage system 112 may be comprised of a plurality of storage nodes 111, 113, 115. Data storage system 112 may ingest and store data received from primary system 102 via connection 110. Each storage node of data storage system 112 may have its own corresponding processor. The one or more storage nodes may be comprised of one or more tiers of storage. A high performance tier may be a storage tier with faster performance than one or more other storage tiers that may be available to the system. For example, the high performance tier of storage may be comprised of one or more SSDs and the non-high performance tier of storage may be comprised of one or more HDDs. In some embodiments, each storage node is comprised of a processor and a plurality of solid state drives. The plurality of solid state drives may be divided into a plurality of storage tiers based on performance of a solid state drive with respect to the other solid state drives of the system (e.g., high performance storage tier, medium performance storage tier, low performance storage tier).

In other embodiments, data storage system 112 is comprised of one or more virtual storage nodes that are operating in a cloud environment (e.g., public cloud, private cloud). Each virtual storage node may have a corresponding amount of storage. An application may be deployed to the one or more virtual storage nodes. The application may be scaled up or scaled down, as described herein, when deployed to the one or more virtual storage nodes.

The data received from primary system 102 may be stored in one or more of the storage nodes 111, 113, 115. In some embodiments, the one or more storage nodes store one or more copies of the data. In one embodiment, data storage system 112 is comprised of one SSD and three HDDs. The data received from primary system 102 may be stored in the one or more SSDs and/or the one or more HDDs.

In some embodiments, the data received from primary system 102 includes file system data that is included in a backup snapshot. A backup snapshot may represent a state of the file system data of primary system 102 at a particular moment in time. In some embodiments, the backup snapshot is a full backup snapshot and includes all of the file system data stored on primary system 102 at the time at which the backup snapshot is performed. In some embodiments, the backup snapshot is an incremental backup snapshot and includes the file system data stored on primary system 102 that was not previously backed up.

A storage node of data storage system 112 may include a processor that is configured to run file system manager 117. In some embodiments, the processors of a plurality of storage nodes of data storage system 112 are configured to run file system manager 117. File system manager 117 may be configured to organize in a tree data structure the file system data received in a backup snapshot from primary system 102. An example of the tree data structure is a file system metadata snapshot tree (e.g., Cohesity Snaptree®), which may be based on a B+ tree structure (or other type of tree structure in other embodiments). The tree data structure provides a view of the file system data corresponding to a backup snapshot. The view of the file system data corresponding to the backup snapshot may be comprised of a file system metadata snapshot tree and a plurality of file metadata structures (also referred to as a "file metadata tree"). A file metadata structure may correspond to one of the files included in the backup snapshot. The file metadata structure is a snapshot structure that stores the metadata associated with the file. The file system metadata snapshot tree and file metadata structures may be stored in metadata store 114. Metadata store 114 may store a view of file system data corresponding to a backup snapshot. Metadata store 114 may also store data associated with content files that are smaller than a limit size (e.g., 256 kB). Metadata store 114 may be stored across the high performance tier of storage nodes 111, 113, 115.

The tree data structure may be used to capture different versions of backup snapshots. The tree data structure allows a chain of file system metadata snapshot trees corresponding to different versions of backup snapshots (i.e., different file system metadata snapshot tree versions) to be linked together by allowing a node of a later version of a file system metadata snapshot tree to reference a node of a previous version of a file system metadata snapshot tree (e.g., a "snapshot tree forest"). For example, a root node or an intermediate node of a second file system metadata snapshot tree corresponding to a second backup snapshot may reference an intermediate node or leaf node of a first file system metadata snapshot tree corresponding to a first backup snapshot.

A file system metadata snapshot tree is a representation of a fully hydrated backup because it provides a complete view of the storage volume(s) of primary system 102 at a particular moment in time. A fully hydrated backup is a backup that is ready for use without having to reconstruct a plurality of backups to use it. Previous systems may reconstruct a backup by starting with a full backup and applying one or more changes associated with one or more incremental backups to the data associated with the full backup. In contrast, any file stored in the storage volume at a particular time and the file's contents, for which there is an associated backup, may be determined from the file system metadata snapshot tree, regardless if the associated backup snapshot was a full backup snapshot or an incremental backup snapshot. Creating an incremental backup snapshot may only include copying data of the storage volume(s) that was not previously backed up. However, the file system metadata snapshot tree corresponding to the incremental backup snapshot provides a complete view of the storage volume(s) at the particular moment in time because it includes references to data of the storage volume that was previously stored. For example, a root node associated with the file system metadata snapshot tree may include one or more references to leaf nodes associated with one or more previous backup snapshots and one or more references to leaf nodes associated with the current backup snapshot. This may provide significant savings in the amount of time needed to restore or recover a storage volume and/or a database. In contrast, previous recovery/restoration methods may require significant time, storage, and computational resources to reconstruct a particular version of a volume or database from a full backup and a series of incremental backups.

A file system metadata snapshot tree may include a root node, one or more levels of one or more intermediate nodes associated with the root node, and one or more leaf nodes associated with an intermediate node of the lowest intermediate level. The root node of a file system metadata snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a file metadata structure (e.g., Blob structure), or a pointer to a data chunk stored on the data storage system.

Data associated with a file that is smaller than or equal to a limit size (e.g., 256 kB) may be stored in a leaf node of the file system metadata snapshot tree. A leaf node may be an index node (inode). A file metadata structure may be generated for a file that is larger than the limit size. The file metadata structure is configured to store the metadata associated with a version of a file.

The file metadata structure may include a root node, one or more levels of one or more intermediate nodes associated with the root node, and one or more leaf nodes associated with an intermediate node of the lowest intermediate level. The tree data structure associated with a file metadata structure may allow a chain of file metadata structures corresponding to different versions of a file to be linked together by allowing a node of a later version of a file metadata structure to reference a node of a previous version of a file metadata structure. For example, a root node or an intermediate node of a second file metadata structure corresponding to a second version of a file may reference an intermediate node or leaf node of a first file metadata structure corresponding to a first version of the file. A file metadata structure may be associated with a plurality of chunk files. A chunk file may be comprised of a plurality of file segment data chunks.

A leaf node of a file metadata structure may store a value, such as an identifier of a data brick associated with one or more data chunks. For example, a file metadata structure may correspond to a file and a leaf node of the file metadata structure may include a pointer to or an identifier of a data brick associated with one or more data chunks of the file. A data brick may be associated with one or more data chunks. In some embodiments, the size of a brick is 256 kB. The one or more data chunks may be of variable length within a particular range (e.g., 4 kB to 64 kB).

The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Data storage system 112 may be configured to run one or more core functionalities. A core functionality may be data storage system 112 infrastructure that is pre-installed on the data storage system before data storage system 112 is provided to a user. For example, the one or more core functionalities of data storage system 112 may include data backup, data restoration, data replication, data archival, storage filer, operating system, garbage collection, infrastructure needed to execute one or more applications (e.g., hypervisor, container infrastructure) etc. Data storage system 112 has a total amount of available resources and may need a portion of the total amount of available resources to perform the one or more core functionalities. The amount of resources needed to perform the one or more applications may change over time based on a schedule associated with the one or more applications. For example, a first set of resources may be needed to back up data, a second set of resources may be needed to restore data, a third set of resources may be needed to replicate data, a fourth set of resources may be needed to perform garbage collection, . . . , and an nth set of resources may be needed to perform an nth core functionality. Data storage system 112 may not need to reserve resources for all of the core functionalities at a particular point in time because all of the core functionalities are not scheduled to be performed at the particular point in time.

The total amount of available resources less the amount of resources reserved for one or more core functionalities may be the amount of resources available for one or more applications. Each of the one or more applications may be provisioned a corresponding default amount of resources. The default amount of resources allocated for a first application may be different from the default amount of resources allocated for a second application. After each of the one or more applications is provisioned their corresponding default amount of resources, data storage system 112 may have a surplus of resources available for one or more applications. Data storage system 112 may provision the surplus of resources for one or more applications to scale up the one or more applications.

Data storage system 112 may be configured to store and run one or more applications. The one or more applications may be configured to run one or more processes on the data that is backed up from primary system 102 to data storage system 112. In some embodiments, the one or more applications are configured to run one or more processes on the data that is generated on or by data storage system 112 (e.g., data generated by a storage filer). In some embodiments, the one or more applications may be configured to run as a background process on data storage system 112.

In some embodiments, an application is stored on a data storage system as a set of container images. When the application is executed on the data storage system, the application may be comprised of one or more layers where each layer is comprised of one or more virtualization containers. Each virtualization container associated with the application may perform a service or process. For example, a first layer of the application may be comprised of one virtualization container, the second layer of the application may be comprised of two virtualization containers, and the third layer of the application may be comprised of one virtualization container. Each layer may be comprised of one or more virtualization container types. For example, a layer may be comprised of a first type of virtualization container and a second type of virtualization container. The plurality of layers may expressed using a resource ratio. An application comprised of a first layer having one virtualization container, a second layer having two virtualization containers, and a third layer having one virtualization container has a resource ratio of 1:2:1. The application developer may specify the resource ratio that is to be maintained to ensure that the application works properly. The application developer may also specify the one or more container types associated with each application layer.

Data storage system 112 has a total amount of available resources. The total amount of available resources associated with data storage system 112 is based on the storage nodes 111, 113, 115. The total amount of available resources associated with data storage system 112 may change at any moment. For example, a storage node may go offline or a storage node may be added to data storage system 112. Resource manager 116 may monitor the storage nodes of data storage system 112 to determine the total amount of available resources associated with data storage system 112 at any point in time. This may assist resource manager 116 to properly allocate system resources for the one or more core functionalities and the one or more applications. Overall system performance may be degraded in the event resource manager 116 accidentally allocates, for an application, resources that should be allocated for the one or more core functionalities associated with data storage system 112.

Resource manager 116 may be configured to monitor the system resource utilizations by the one or more core functionalities of data storage system 112. Resource manager 116 may be running on one of the storage nodes 111, 113, 115. In some embodiments, resource manager 116 is running across a plurality of the storage nodes 111, 113, 115. Resource manager 116 may prioritize the one or more core functionalities of data storage system 112 over the one or more applications, i.e., system resources of data storage system 112 are first allocated to the one or more core functionalities and any remaining resources are allocated to the one or more applications. Resource manager 116 may be configured to allocate resources such that data storage system 112 is able to perform the one or more core functionalities and to provide the corresponding default amount of resources needed to run the one or more applications. In some embodiments, resource manager 116 has a surplus of resources (e.g., additional resources in excess of the default amount of resources allocated to the one or more applications) to allocate because the one or more core functionalities may be consuming less than the amount of resources reserved for the one or more core functionalities. Resource manager 116 may re-allocate the surplus of resources for the one or more applications, i.e., provide one or more applications with additional resources.

Additional resources may be provisioned for an application to improve a performance of the application. However, merely provisioning additional resources to an application may cause the application to experience problems, such as suboptimal operation or an inefficient usage of resources. An application may be comprised of a plurality of layers where each layer is comprised of one or more virtualization containers. Data storage system 112 may have additional resources to add an additional virtualization container to one of the virtualization container layers. However, adding an additional virtualization container to one of the virtualization container layers may create bottlenecks within the application. For example, an application may be comprised of three layers and have a resource ratio of 1:2:1. Additional resources may be provided such that the resource ratio is 1:3:1. The second layer of virtualization containers may process data at such a rate that the virtualization container of the third layer is unable to maintain the rate at which it processes data. In some embodiments, adding an additional virtualization container to one of the virtualization container layers without adding virtualizations containers to the other virtualization container layers may cause the application to stop working.

A portion of the total amount of available resources may be reserved for the one or more core functionalities. The total amount of available resources less the amount of resources reserved for one or more core functionalities may be the amount of resources available to operate the one or more applications. A surplus of resources may be available for the one or more applications. The surplus of resources are additional resources in excess of the default amount of resources allocated to the one or more applications. Resource manager 116 may provision the additional resources to an application based on the resource ratio. A certain amount of resources is needed to scale the number of virtualization containers of an application to a multiple of the resource ratio. For example, the application may have a resource ratio of 1:2:1 and the number of virtualization containers of the application may be scaled to 2:4:2, 3:6:3, . . . , n:2n:n. Resource manager 116 may compare the amount of resources needed to scale the number of virtualization containers of the application to a multiple of the resource ratio to the surplus of resources associated with data storage system 112. In the event the amount of resources needed to scale the number of virtualization containers of the application to a multiple of the resource ratio is less than the surplus of resources associated with data storage system 112, resource manager 116 may provision additional resources to the application. In some embodiments, the number of virtualization containers at each layer is a relative number.

In some embodiments, the number of virtualization containers of the application is scaled to more than a threshold multiple of the resource ratio (e.g., 10×). For applications that are to be scaled more than a threshold multiple of the resource ratio (e.g., 10×), a layer comprising a plurality of virtualization containers may be scaled up according to the application container within a threshold number of virtualization containers (e.g., ±one virtualization container) without degrading a performance of the application. For example, for an application having a resource ratio of 1:2:1, the number of virtualization containers may be scaled to 10:20:9 or 10:20:11 without degrading a performance of the application. The threshold multiple of the resource ratio and the threshold number of virtualization containers may be specified by a user of the data storage system or an app developer of the application.

Other factors may be considered by resource manager 116 when determining whether to provision additional resources to an application. For example, resource manager 116 may provision resources for an application based on an amount of data associated with the application. The plurality of files stored by data storage system 112 may be tagged with a file type. Data storage system 112 may use the file type tags to determine the amount of data of a particular type stored by data storage system 112 and to determine the amount of data associated with the application. Resource manager 116 may determine whether to provision additional resources for the application based on whether the additional resources result in an improved performance of the application that is greater than a threshold amount.

Resources may be provisioned to an application based on a schedule associated with the one or more core functionalities associated with data storage system 112. One or more core functionalities may be scheduled to be performed at a particular time. Resource manager 116 may estimate the amount of resources that the one or more core functionalities will need at the particular time. In the event the data storage system is able to perform one or more core functionalities associated with the data storage system at their scheduled times, resource manager 116 may provision the additional resources to one or more applications.

In some embodiments, an application is stored as one or more virtual machine images. When the one or more virtual machine images are executed by data storage system 112, the application may be comprised of one or more layers where each layer is comprised of one or more virtual machines. The application comprised of a plurality of virtual machines may be scaled up or scaled down based on a resource ratio when executed by a data storage system. The resource ratio for an application comprised of one or more layers where each layer is comprised of one or more virtual machines describes the number of virtual machines at each layer of the application. The number of virtual machines of the application may be scaled to a multiple of the resource ratio in a similar manner as the number of virtualization containers of the application are scaled to a multiple of the resource ratio, as described herein.

A virtualization container and a virtual machine may both be referred to as a "virtualization resource unit."

Figure 2A:
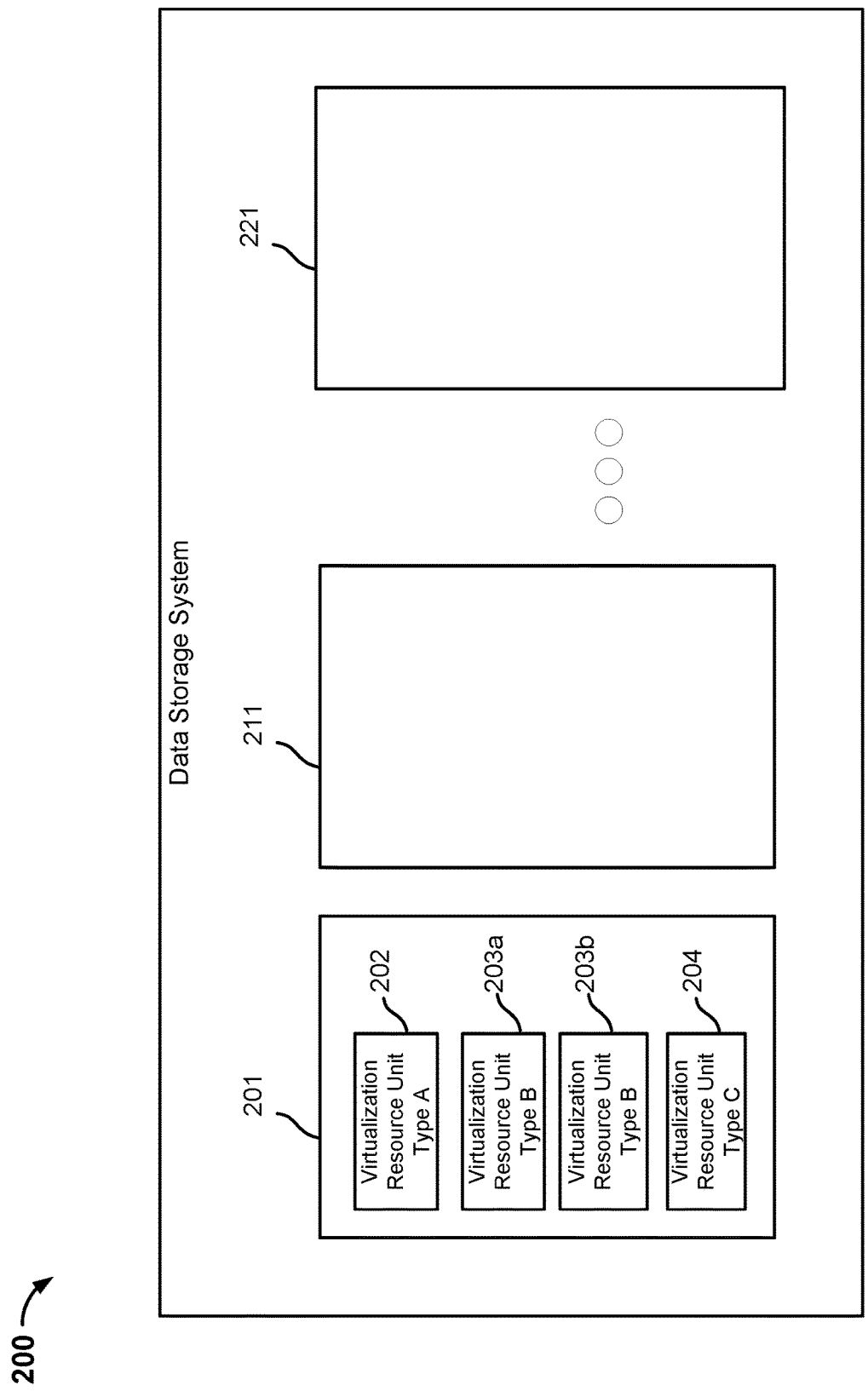
FIG. 2A is a block diagram illustrating an example of an application hosted on a data storage system in accordance with some embodiments.

FIG. 2A is a block diagram illustrating an example of an application hosted on a data storage system in accordance with some embodiments. In the example shown, data storage system 200 may be implemented as a data storage system, such as data storage system 112.

Data storage system 200 is comprised of storage nodes 201, 211, 221. Although three storage nodes are depicted, data storage system 200 may be comprised of n storage nodes. In some embodiments, data storage system 200 is comprised of a plurality of homogeneous storage nodes where each storage node has the same configuration (e.g., same processing power, storage space, and memory resources). In some embodiments, data storage system 200 is comprised of a plurality of heterogeneous storage nodes where at least one of the storage nodes has a different configuration than at least one of the other storage nodes.

In the example shown, an application is hosted on storage node 201 and is comprised of four virtualization resource units. The application may have a resource ratio of 1:2:1. The first layer may be comprised of an instance 202 of virtualization resource unit type A, the second layer may be comprised of a first instance 203a of virtualization resource unit type B and a second instance 203b of virtualization resource unit type B, and the third layer may be comprised of an instance 204 of virtualization resource unit type C. In some embodiments, a layer may be comprised of a plurality of virtualization resource units. A layer may be comprised of a plurality of instances of the same type of virtualization resource unit. A layer may be comprised of different types of virtualization resource units. A layer may be comprised of at least two instances of the same type of virtualization resource unit and one or more other types of virtualization resource units.

Figure 2B:
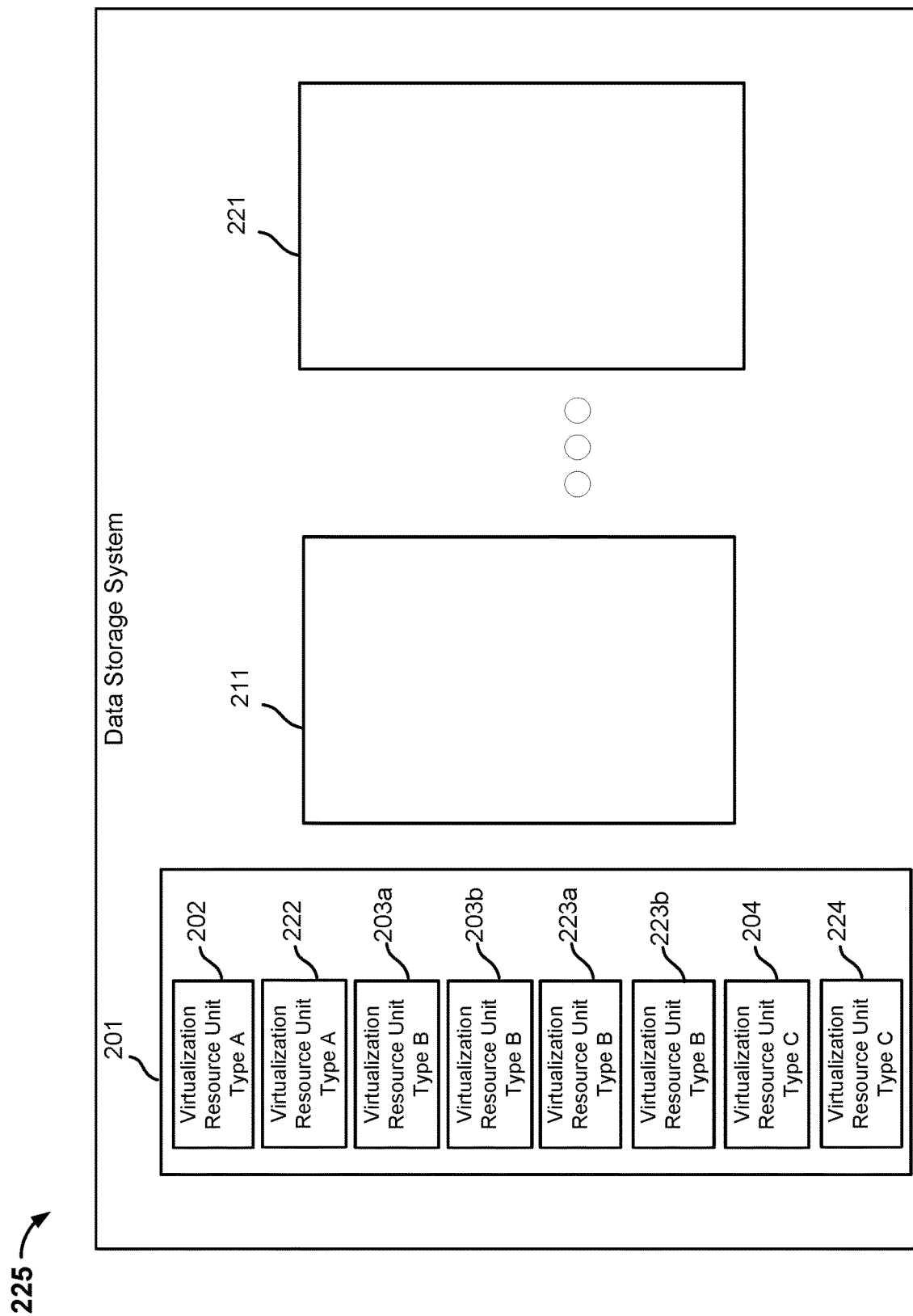
FIGS. 2B, 2C, and 2D are block diagrams illustrating examples of a scaled application hosted on a data storage system in accordance with some embodiments.
Figure 2C:
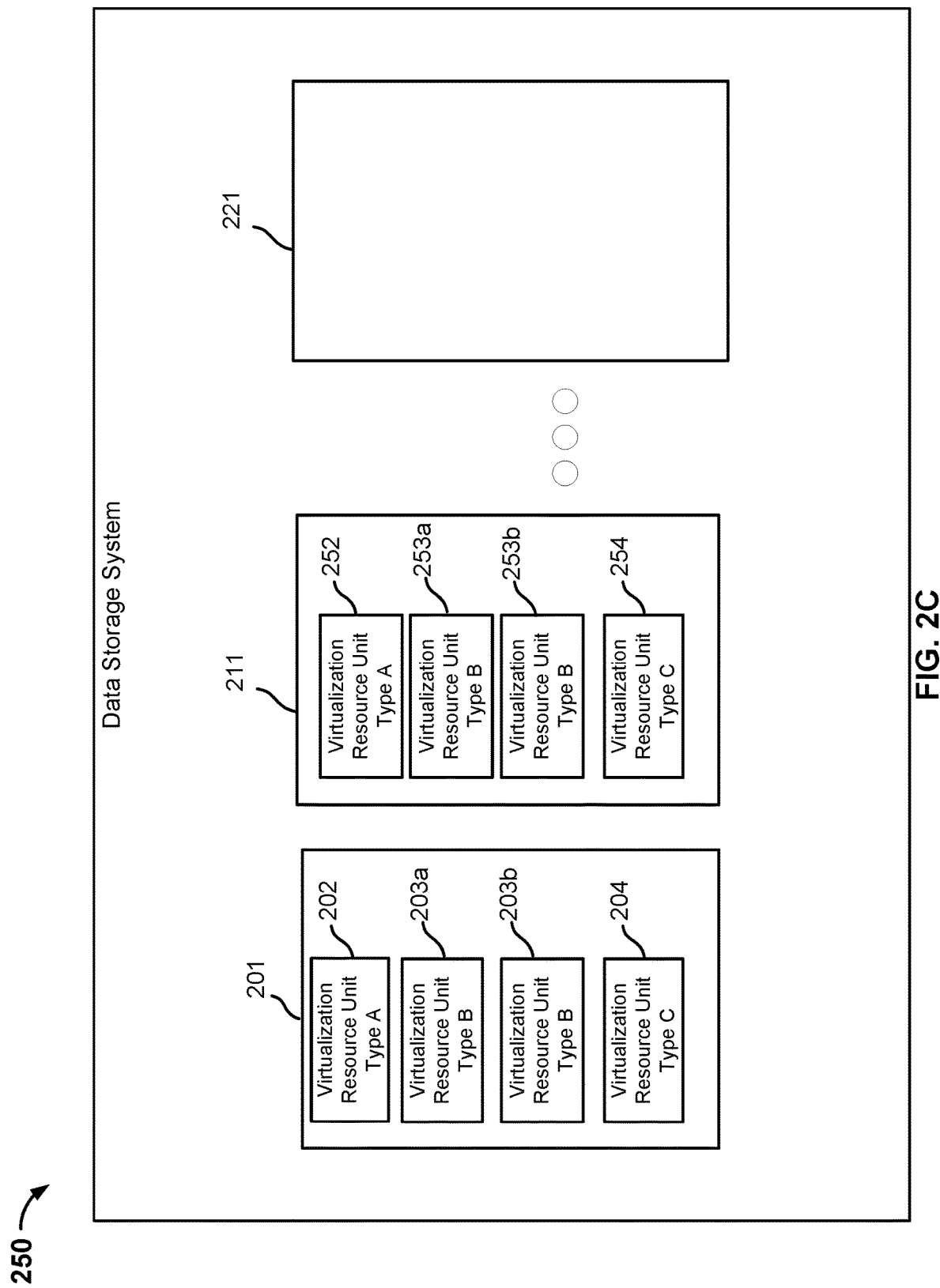
Figure 2D:
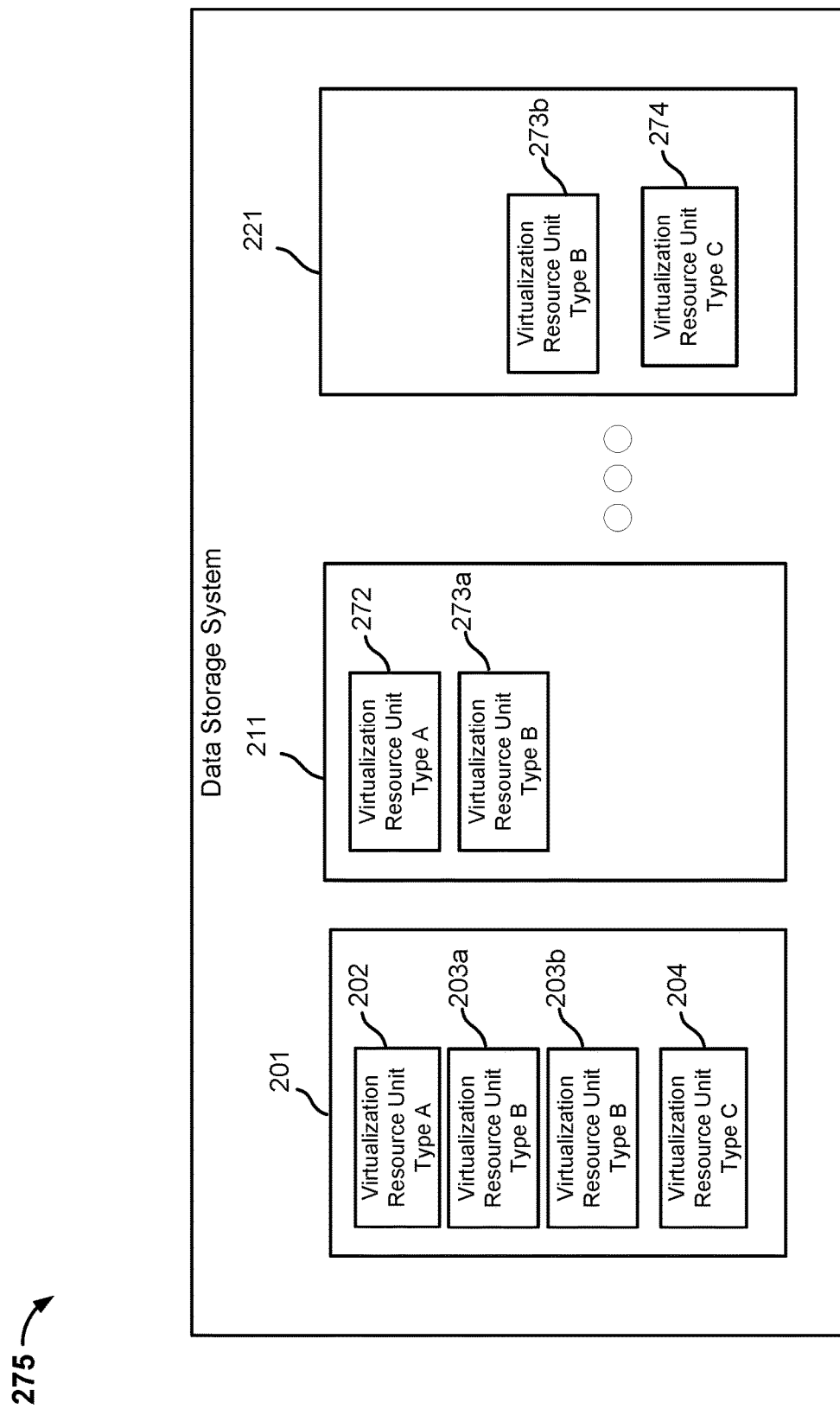

FIGS. 2B, 2C, and 2D are block diagrams illustrating examples of a scaled application hosted on a data storage system in accordance with some embodiments. In the example shown, data storage systems 225, 250, 275 may be implemented as a data storage system, such as data storage system 112.

In the example shown, additional resources have been provisioned for an application. A data storage system may provision additional resources to an application based on a resource ratio associated with the application.

Merely provisioning additional resources to an application may cause the application to experience problems, such as suboptimal operation or an inefficient usage of resources. An application may be comprised of a plurality of layers where each layer is comprised of one or more virtualization resource units (e.g., virtualization container, virtual machine). The data storage system may have additional resources to add an additional virtualization resource unit to one of the application layers. However, adding an additional virtualization resource unit to one of the application layers may create bottlenecks within the application. In some embodiments, adding an additional virtualization resource unit to one of the layers without adding virtualization resource units to the other layers may cause the application to stop working.

A particular amount of resources is needed to scale the number of virtualization resource units of the application to a multiple of the resource ratio. In the example shown, the application has a resource ratio of 1:2:1 and the number of virtualization resource units of the application may be scaled to a multiple of the resource ratio, such as 2:4:2, 3:6:3, . . . , n:2n:n. The amount of resources needed to scale up the number of virtualization resource units of the application to a multiple of the resource ratio may be compared to the surplus of resources associated with the data storage system. In the event the amount of resources needed to scale the number of virtualization resource units of the application to a multiple of the resource ratio is less than or equal to the surplus of resources associated with the data storage system, additional resources may be provisioned to the application. In the event the amount of resources needed to scale the number of virtualization resource units of the application to a multiple of the resource ratio is more than the surplus of resources associated with the data storage system, additional resources may not be provisioned to the application.

In the example shown, the number of virtualization resource units of the application has been scaled to 2:4:2. The first layer is comprised of a first instance 202 of virtualization resource unit type A and a second instance 222 of virtualization resource unit type A, the second layer is comprised of a first instance 203a of virtualization resource unit type B, a second instance 203b of virtualization resource unit type B, a third instance 223a of virtualization resource unit type B, and a fourth instance 223b of virtualization resource unit type B, and the third layer is comprised of a first instance 204 of virtualization resource unit type C and a second instance 224 of virtualization resource unit type C.

In some embodiments, for example as shown in FIG. 2B, the additional virtualization resource units are hosted on the same storage node as the initial virtualization resource units. In some embodiments, for example as shown in FIG. 2C, the additional virtualization resource units are hosted on a different storage node than the storage node hosting the initial virtualization resource units. As seen in FIG. 2C, the number of virtualization resource units of the application has been scaled to 2:4:2. The first layer is comprised of a first instance 202 of virtualization resource unit type A and a second instance 252 of virtualization resource unit type A. The first instance 202 of virtualization resource unit type A is hosted on storage node 201 and the second instance 252 of virtualization resource unit type A is hosted on storage node 211. The second layer is comprised of a first instance 203a of virtualization resource unit type B, a second instance 203b of virtualization resource unit type B, a third instance 253a of virtualization resource unit type B, and a fourth instance 253b of virtualization resource unit type B. The first and second instances 203a, 203b of virtualization resource unit type B are hosted on storage node 201 and the third and fourth instances 253a, 253b of virtualization resource unit type B are hosted on storage node 211. The third layer is comprised of a first instance 204 of virtualization resource unit type C and a second instance 254 of virtualization resource unit type C. The first instance 204 of virtualization resource unit type C is hosted on storage node 201 and the second instance 254 of virtualization resource unit type C is hosted on storage node 211.

In some embodiments, the additional virtualization resource units are hosted across a plurality of the storage nodes of data storage system 275. As seen in FIG. 2D, the number of virtualization resource units of the application has been scaled to 2:4:2. The first layer is comprised of a first instance 202 of virtualization resource unit type A and a second instance 272 of virtualization resource unit type A. The first instance 202 of virtualization resource unit type A is hosted on storage node 201 and the second instance 272 of virtualization resource unit type A is hosted on storage node 211. The second layer is comprised of a first instance 203a of virtualization resource unit type B, a second instance 203b of virtualization resource unit type B, a third instance 273a of virtualization resource unit type B, and a fourth instance 273b of virtualization resource unit type B. The first and second instances 203a, 203b of virtualization resource unit type B are hosted on storage node 201, the third instance 273a of virtualization resource unit type B is hosted on storage node 211, and the fourth instance 273b of virtualization resource unit type B is hosted on storage node 221. The third layer is comprised of a first instance 204 of virtualization resource unit type C and a second instance 274 of virtualization resource unit type C. The first instance 204 of virtualization resource unit type C is hosted on storage node 201 and the second instance 274 of virtualization resource unit type C is hosted on storage node 221.

Figure 3:
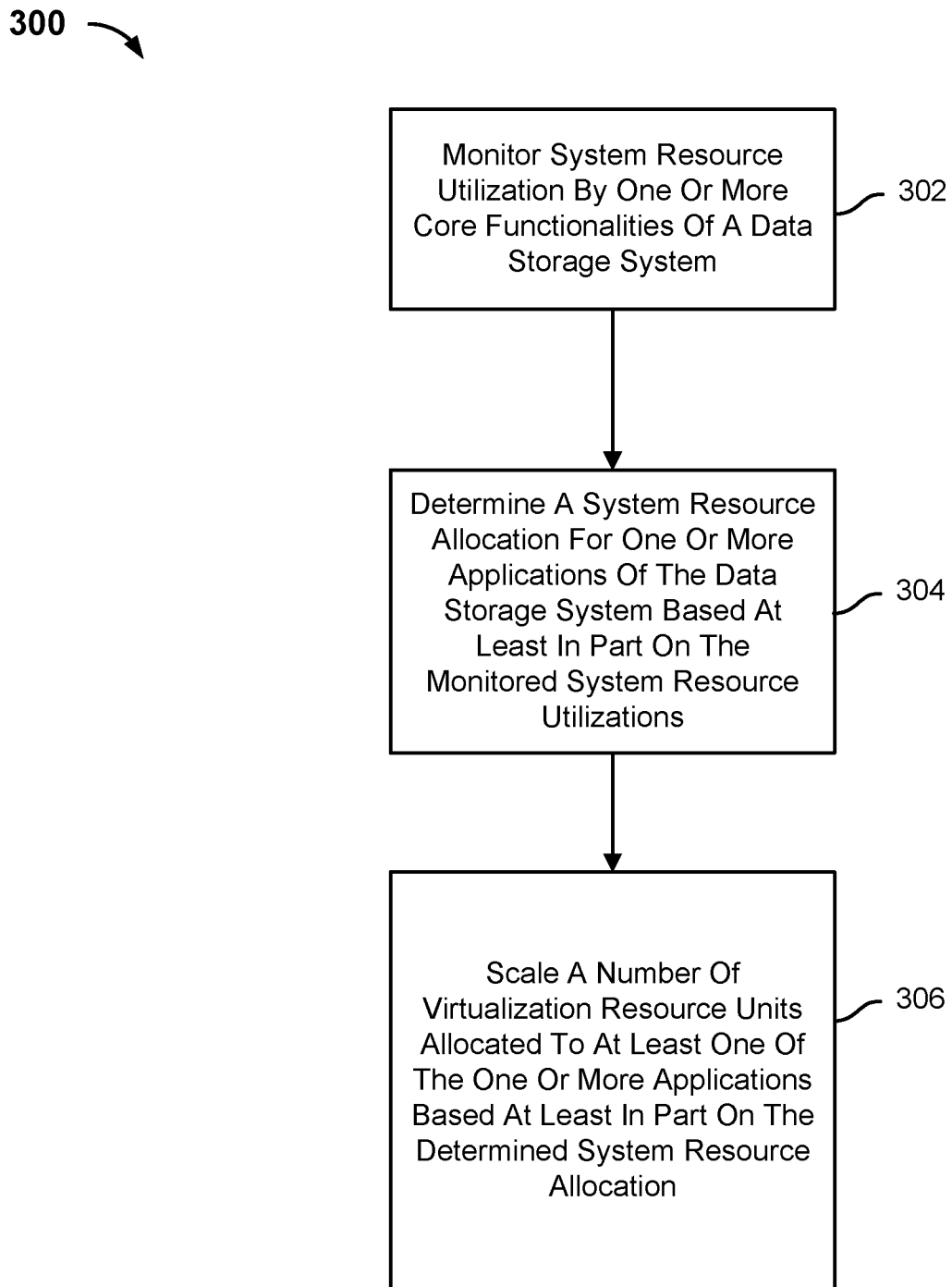
FIG. 3 is a flow chart illustrating a process for scaling an application hosted on a data storage system in accordance with some embodiments.

FIG. 3 is a flow chart illustrating a process for scaling an application hosted on a data storage system in accordance with some embodiments. Process 300 may be implemented by a data storage system, such as data storage system 112. Process 300 may be performed according to a schedule (e.g., hourly, daily, etc.) In some embodiments, process 300 is dynamically performed as resources become available or unavailable for one or more applications. In some embodiments, the application is comprised of one or more layers where each layer is comprised of one or more virtualization resource units. In some embodiments, a virtualization resource unit is a virtualization container. In some embodiments, a virtualization resource unit is a virtual machine.

At 302, system resource utilization by one or more core functionalities of a data storage system is monitored. For example, the one or more core functionalities of the data storage system may include data backup, data restoration, data replication, data archival, storage filer, operating system, infrastructure needed to execute one or more applications (e.g., hypervisor, container infrastructure) etc. The data storage system has a total amount of available resources to run the one or more core functionalities. A portion of the total amount of available resources may be reserved for the one or more core functionalities. The portion of the total amount of available resources reserved for the one or more core functionalities may vary over time depending upon the resource needs of the one or more core functionalities. The total amount of available resources less the amount of resources reserved for one or more core functionalities may be the amount of resources available to operate the one or more applications. The amount of resources of the data storage system may change based on a number of online storage nodes associated with the data storage system. The one or more core functionalities of the data storage system may be given resource priority over the one or more applications. The amount of resources needed by the one or more core functionalities is determined.

At 304, a system resource allocation for one or more applications of the data storage system is determined based at least in part on the monitored system resource utilizations. Each of the one or more applications requires a corresponding default amount of resources to operate. The data storage system may be configured to allocate resources such that the data storage system is able to perform the one or more core functionalities and to provide the corresponding default amount of resources needed to run the one or more applications. The determined amount of resources needed by the one or more core functionalities may be subtracted from the total amount of resources of the data storage system to determine an amount of resources available for one or more applications. In some embodiments, the system resource allocation for one or more application of the data storage system is determined in response to a change in the monitored system resource utilizations.

At 306, a number of virtualization resource units allocated to at least one of the one or more applications is scaled based at least in part on the determined system resource allocation. In some embodiments, the virtualization resource units are virtualization containers. An application may be scaled up or scaled down based on a multiple of the resource ratio. In some embodiments, the virtualization resource units are virtual machines. An application may be scaled up or scaled down based on a multiple of the virtual machine ratio.

A resource manager of a data storage system may allocate resources to the application to scale up or scale down the number of virtualization resource units associated with the application. The resource manager may have an overall view of the resources needed by the one or more core functionalities and a schedule of when the one or more core functionalities need corresponding resources.

In some embodiments, the number of virtualization resource units associated with an application is scaled up when the application is launched. The number of virtualization resource units associated with the application may be scaled up based on a multiple of a resource ratio associated with the application. For example, the application may have a resource ratio of 1:2:1 and the number of virtualization containers of the application may be scaled to a multiple of the resource ratio, such as 2:4:2, 3:6:3, . . . , n:2n:n. In some embodiments, the number of virtualization resource units associated with an application is scaled up while the application is running.

An application may only process jpeg data. The data storage system may store jpeg files occupying a small amount of storage (e.g., less than 100 MB of jpeg files).

Even though additional resources may be provisioned to the application, a resource manager of the data storage system may decide against provisioning additional resources to the application because the improvement in performance of the application is negligible (performance doesn't improve more than a threshold amount). The additional resources that may be provisioned for the application may be provisioned to a different application. In some embodiments, the data storage system may store jpeg files occupying a large amount of storage (e.g., more than 1 TB of jpeg files). The data storage system may provision additional resources to the application when they become available to help the application process jpeg files faster because the improvement in performance of the application is non-negligible (performance improves more than a threshold amount). The plurality of files stored by the data storage system may be tagged with a file type. The data storage system may use the file type tags to determine the amount of data of a particular type stored by the data storage system, to determine the amount of data to be processed by the application, and to determine whether provisioning additional resources for the application results in a non-negligible improvement in a performance of the application. In some embodiments, a user associated with the data storage system specifies an amount of resources that may be provisioned for an application. The user associated with the storage system may indicate that an application is not to be scaled up in the event a surplus of resources exists (e.g., because the improvement in performance is not greater than a threshold amount). In some embodiments, the one or more applications are scaled up or scaled down based on an amount of latency associated with the data storage system.

Resources may be provisioned to one or more applications based on a schedule associated with the one or more core functionalities of the data storage system. One or more core functionalities may be scheduled to be performed at a particular time. The data storage system can estimate the amount of resources that the one or more core functionalities will need at the particular time. In the event the data storage system is able to perform the one or more core functionalities associated with the data storage system at the particular time, the data storage system may provision the remaining resources for one or more applications.

Using a resource ratio to scale up virtualization resource units associated with an application may not only ensure that the application will process data faster, but also may ensure that the application is able to properly function. Furthermore, providing the one or more core functionalities of a data storage system with resource priority over the one or more application may ensure that the one or more core functionalities of the data storage system are not disrupted from properly functioning.

In some embodiments, the number of virtualization resource units associated with an application is scaled down. A process of the data storage system may give to the application a command to scale down the application. In response to the command, the application may scale down the number of virtualization resource units associated with the application. The application may have a built-in process to scale down the application in response to a command. The number of virtualization resource units associated with an application may be scaled down while the application is running. In some embodiments, the application may transition to a scaled down version of the application. A scaled down version of the application may include the default amount of resources. In some embodiments, the scaled down version of the application includes an amount of resources to support a number of virtualization resource units that is a multiple of the resource ratio, but the multiple of the resource ratio is less than the multiple of the scaled up version of the application. For example, a scaled up version of the application may include a number of virtualization resource units that is a 5× multiple of the resource ratio and a scaled down version of the application may include a number of virtualization resource units that is a 3× multiple of the resource ratio.

An application may have been previously scaled up when the data storage system had a surplus of resources and may need to be scaled down in response to a trigger event. A trigger event may include a resource manager of the data storage system determining that the amount of resources consumed by one or more core functionalities is increasing or is scheduled to be increased. In response to the determination, the resource manager may re-allocate the additional resources allocated to the one or more applications to the one or more core functionalities. The trigger event may occur when the application completes its task (e.g., after an anti-virus scan). In response to the application completing its task, the resource manager may re-allocate the resources of the completed application for one or more other applications. The trigger event may occur when another application comes online and needs resources to run. In response to the other application coming online, the resource manager may re-allocate resources that are allocated for the scaled up application for the other application.

In some embodiments, a resource manager determines that high priority applications may be scaled down first before medium priority applications and low priority applications because high priority applications consume more system resources than medium and low priority applications. In some embodiments, a resource manager determines that low priority applications are to be scaled down first before medium priority applications and high priority applications because low priority applications do not need systems resources as much as medium and high priority applications.

Figure 4:
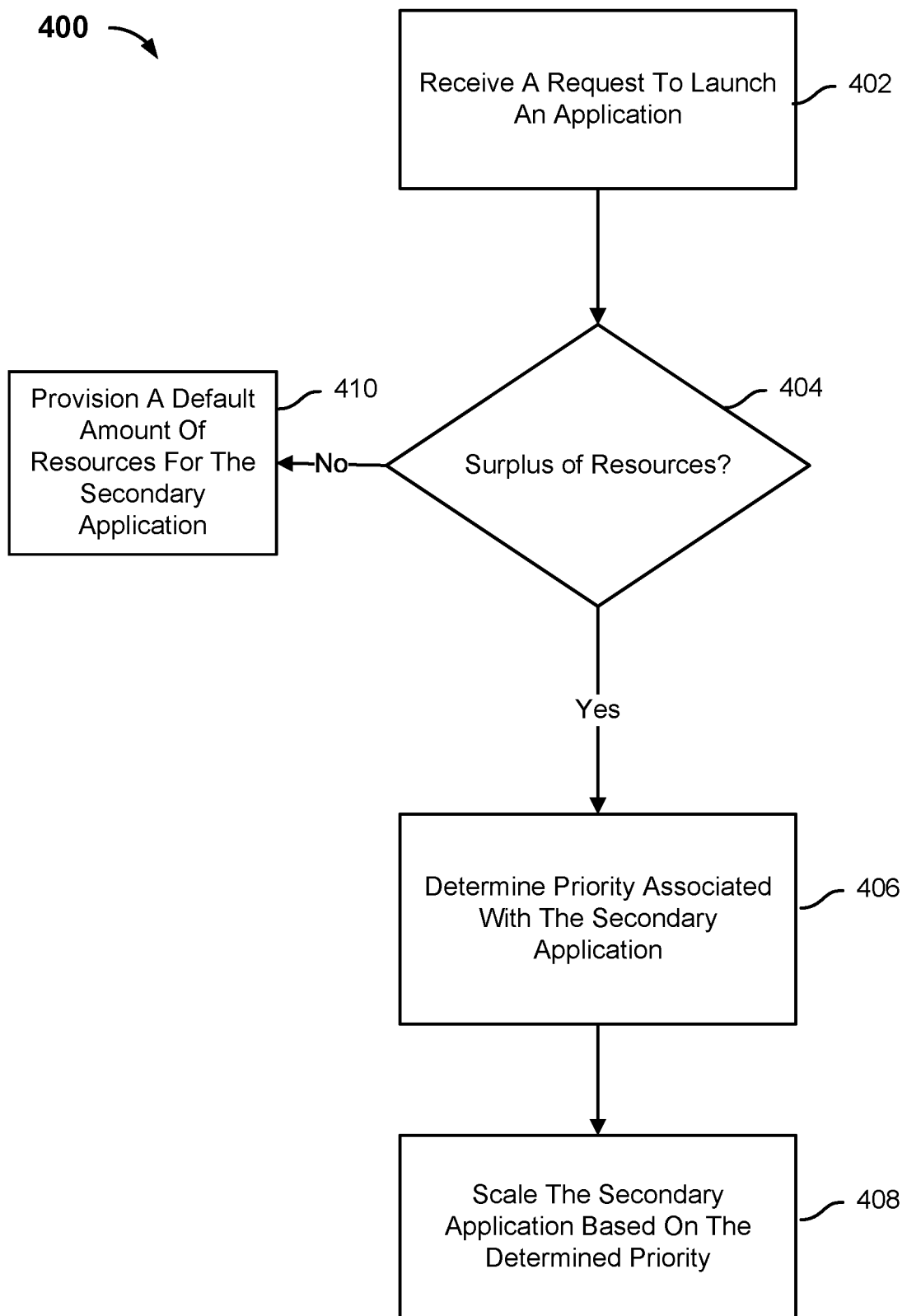
FIG. 4 is a flow chart illustrating a process for scaling an application in accordance with some embodiments.

FIG. 4 is a flow chart illustrating a process for scaling an application in accordance with some embodiments. In the example shown, process 400 may be implemented by a data storage system, such as data storage system 112. Process 400 may be implemented to perform some or all of step 306 of process 300. In some embodiments, the application is comprised of one or more layers where each layer is comprised of one or more virtualization resource units. In some embodiments, a virtualization resource unit is a virtualization container. In some embodiments, a virtualization resource unit is a virtual machine.

A data storage system may be running one or more core functionalities. The one or more core functionalities may require a particular amount of resources. The data storage system has a total amount of available resources. A portion of the total amount of available resources may be reserved for the one or more core functionalities. The portion of the total amount of available resources reserved for the one or more core functionalities may vary over time depending upon the resource needs of the one or more core functionalities.

The data storage system may have one or more applications installed. Examples of applications include, but are not limited to, a data analytics application, an anti-virus application, a malicious software detection application, a search application, etc. The total amount of available resources less the amount of resources reserved for one or more core functionalities may be the amount of resources available to operate the one or more applications.

Each of the applications hosted installed on the data storage system may require a corresponding default amount of resources. An application may run on the data storage system in the event a corresponding default of resources associated with the application is less than or equal to the amount of resources available to operate the one or more applications. The data storage system may have a surplus of resources to provision the application (e.g., additional resources in excess of the default amount of resources allocated to the one or more applications). The application may be scaled up in the event the resources needed to scale up the application are less than or equal to the surplus of resources available.

At 402, a request to launch an application is received. The request may be received from a user associated with a data storage system. In some embodiments, the application is scheduled to be performed at a particular point in time.

At 404, it is determined whether there is a surplus of resources available for the application. In the event a surplus of resources is available for the application, process 400 proceeds to 406. In the event a surplus of resources is not available for the application, process 400 proceeds to 410.

At 406, a priority associated with the application is determined. Each application may have an associated priority. The priority may be based on the total amount of resources needed to scale up the application. Some applications may require more resources than other applications to run. A priority may be assigned to an application based on the default amount of resources needed to run the application. For example, an application that needs less than a first threshold of system resources to run may be classified as a low priority application. An application that needs more than a first threshold of system resources to run but less than a second threshold of system resources to run may be classified as a medium priority application. An application that needs more than a first threshold of system resources and more than a second threshold of system resources to run may be classified as a high priority application.

The priority may be based on an importance of the application. For example, an anti-virus scanning application may be given higher priority than a data analytics application. The importance of the application may be specified by a user associated with the data storage system.

In some embodiments, an application developer specifies the minimum and maximum amount of resources to be allocated for an application. The application may be assigned a priority based on the maximum amount of resources to be allocated for the application.

At 408, the application is scaled based on the determined priority. In some embodiments, the priority associated with an application determines the multiple of the resource ratio to which the number of virtualization resource units of the application is scaled. For example, the application may be a high priority application. The number of virtualization resource units of the high priority application may be scaled to any multiple of the resource ratio that is supported by the surplus of resources.

An application may be a medium priority application. The number of virtualization resource units of the medium priority application may be scaled to a threshold multiple of the resource ratio. The number of resources needed to scale the medium priority application to the threshold multiple of the resource ratio is less than the surplus of resources. Additional resources may be provisioned to the medium priority application to scale the medium priority application to a multiple greater than the threshold multiple of the resource ratio, but a resource manager of the data storage system may decide against provisioning additional resources to the medium priority application beyond the number of resources needed to scale the medium priority application to the threshold multiple of the resource ratio because the application is a medium priority application. A user of the data storage system may specify an application as a medium priority application.

An application may be a low priority application. In some embodiments, the low priority application is not scaled up, even though a surplus of resources is available. A resource manager of the data storage system may decide against provisioning additional resources to the low priority application because provisioning additional resources to the low priority application may not improve a performance of the low priority application more than a threshold amount.

A data storage system may have a particular amount of surplus resources available to scale one or more applications. In the event resources are allocated for a first application, the data storage system may not have any remaining resources to scale up one or more other applications. An application with a higher priority than another application may be scaled up before the other application. For example, an application with a high priority may be scaled up before an application with a medium or low priority. An application with a medium priority may be scaled up before an application with a low priority.

The resources associated with the application may be scaled based on the resource ratio associated with the application.

At 410, a default amount of resources is provisioned for the application. The default amount of resources for the application may be specified by an application developer. The default amount of resources may be the minimum amount of resources needed to run the application. In some embodiments, the default amount of resources may be the amount of resources needed to meet certain performance metrics for the application. The default amount of resources provisioned for a first application may be different than the default amount of resources provisioned for a second application.

Figure 5:
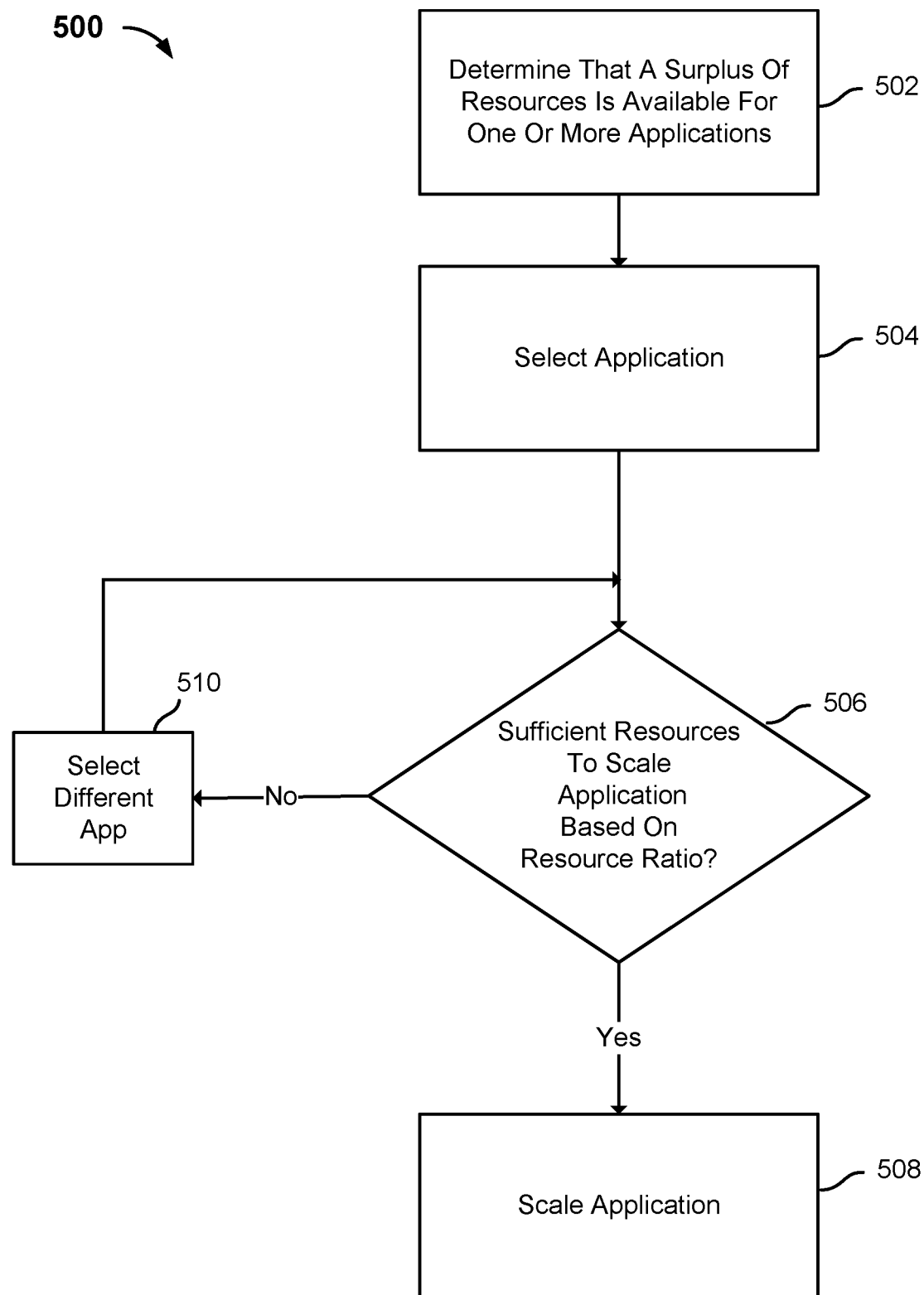
FIG. 5 is a flow chart illustrating a process for scaling an application in accordance with some embodiments.

FIG. 5 is a flow chart illustrating a process for scaling an application in accordance with some embodiments. In the example shown, process 500 may be implemented by a data storage system, such as data storage system 112. Process 500 may be implemented to perform some or all of 306 of process 300. Process 500 may be implemented to perform some or all of 408 of process 400. In some embodiments, the application is comprised of one or more layers where each layer is comprised of one or more virtualization resource units. In some embodiments, a virtualization resource unit is a virtualization container. In some embodiments, a virtualization resource unit is a virtual machine.

At 502, it is determined that a surplus of resources for one or more applications is available. A surplus of resources may be additional resources in excess of the default amount of resources allocated to the one or more applications. A data storage system has a total amount of available resources. A portion of the total amount of available resources may be reserved for one or more core functionalities. The total amount of available resources less the amount of resources reserved for one or more core functionalities is the amount of resources available for one or more applications. Each of the one or more applications may be provisioned a corresponding default amount of resources. The default amount of resources for a first application may be different from the default amount of resources for a second application. After each of the one or more applications is provisioned its corresponding default amount of resources, the data storage system may have a surplus of resources available for the one or more applications.

At 504, an application of the one or more applications is selected. The application may be selected based on a priority associated with the application. For example, an application having a "high priority" may be selected before an application having a "medium priority" and an application having a "medium priority" may be selected before an application having a "low priority." In some embodiments, the application is randomly selected. In some embodiments, the application is selected based on an amount of data to be processed by the application.

At 506, it is determined whether the surplus of resources for the one or more applications is enough to scale an application based on a resource ratio associated with the application.

For example, an application may have a resource ratio of 1:2:1. Each virtualization resource unit associated with the application may require a different amount of resources. To scale up the application, the surplus of resources may need to be greater than the amount of resources needed to scale the number of virtualization resource units of the application to a multiple of the resource ratio.

In the event the surplus of resources for the one or more applications is sufficient to scale the application based on a resource ratio associated with the application, process 500 proceeds to 508. In the event the surplus of resources for the one or more applications is not sufficient to scale the application based on a resource ratio associated with the application, process 500 proceeds to 510.

At 508, the application is scaled based on its corresponding resource ratio. The number of virtualization resource units of the application may be scaled to a multiple of the application's resource ratio. The number of virtualization resource units of the application may be scaled to any multiple of the application's resource ratio as long as the amount of resources needed to scale the number of virtualization resource units of the application to the multiple is less than the surplus of resources available for one or more applications.

In some embodiments, a maximum amount of resources to be provisioned for an application may be specified. In some embodiments, the application is not scaled beyond the specified maximum amount of resources for the application, even if additional resources are available to further scale the application.

At 510, a different application is selected. In some embodiments, the different application is selected based on a priority associated with the different application. In some embodiments, the different application is selected based on application type. In some embodiments, the different application is randomly selected.

Figure 6:
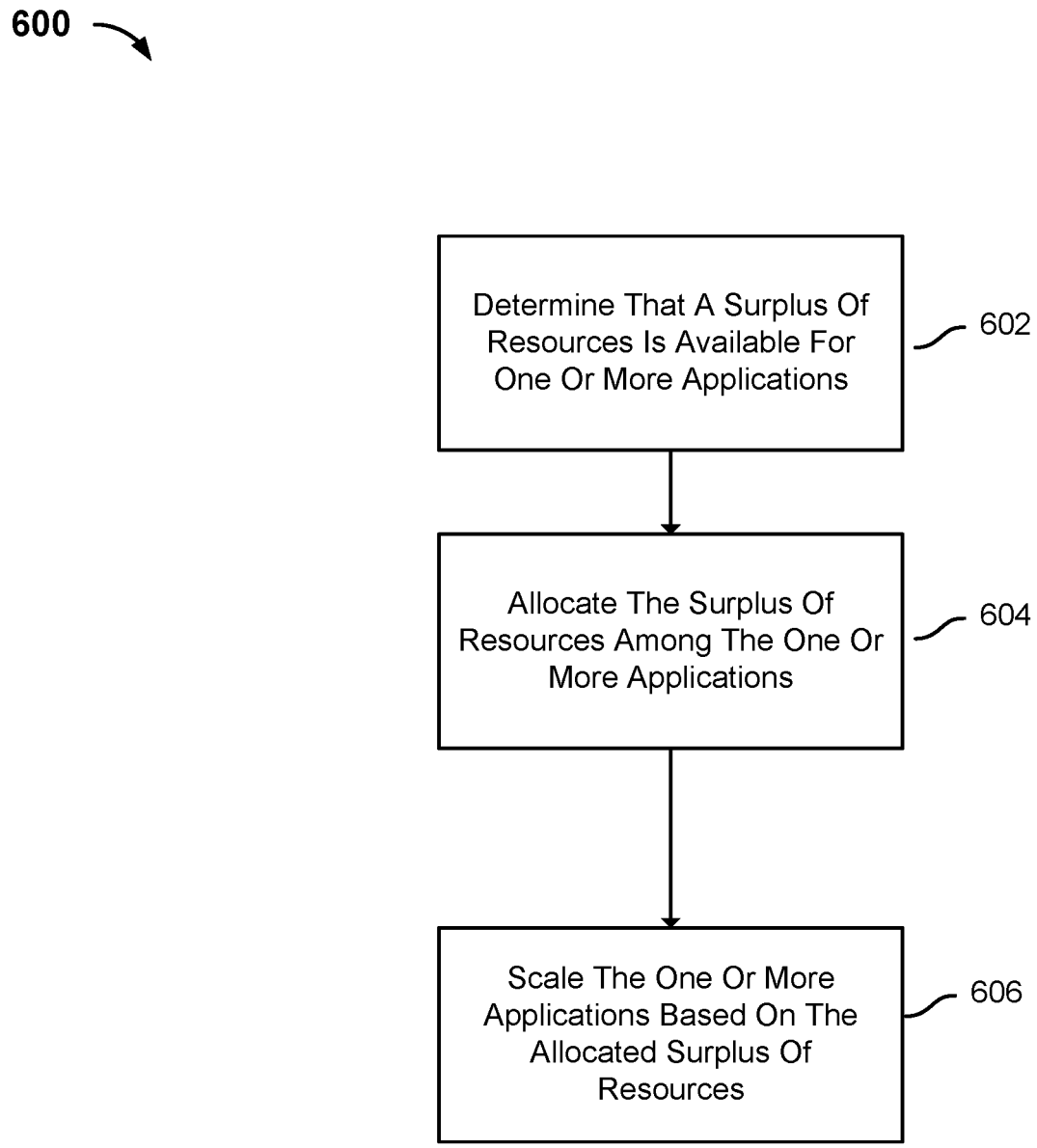
FIG. 6 is a flow chart illustrating a process for scaling a plurality of applications in accordance with some embodiments.

FIG. 6 is a flow chart illustrating a process for scaling a plurality of applications in accordance with some embodiments. In the example shown, process 600 may be implemented by a data storage system, such as data storage system 112. Process 600 may be implemented to perform some or all of 306 of process 300. In some embodiments, the application is comprised of one or more layers where each layer is comprised of one or more virtualization resource units. In some embodiments, a virtualization resource unit is a virtualization container. In some embodiments, a virtualization resource unit is a virtual machine.

At 602, it is determined that a surplus of resources is available for one or more applications. A surplus of resources may be additional resources in excess of the default amount of resources allocated to the one or more applications. A data storage system has a total amount of available resources. A portion of the total amount of available resources may be reserved for one or more core functionalities. The total amount of available resources less the amount of resources reserved for one or more core functionalities is the amount of resources available for one or more applications. Each of the one or more applications may be provisioned a corresponding default amount of resources. The default amount of resources for a first application may be different from the default amount of resources for a second application. After each of the one or more applications is provisioned its corresponding default amount of resources, the data storage system may have a surplus of resources available for the one or more applications.

At 604, the surplus of resources are allocated among the one or more applications. In some embodiments, the surplus of resources are evenly allocated among the one or more applications. For example, the data storage system may be running three applications and have an additional thirty shares of resources to allocate. Each of the three applications may be allocated ten shares of resources.

In some embodiments, the surplus of resources are allocated among the one or more applications based on a priority associated with an application. For example, a high priority application may be given more of the surplus of resources than a medium priority application or a low priority application. Applications with the same priority may be given the same percentage of the surplus of resources. For example, the data storage system may be running three applications and have thirty shares of surplus resources to allocate. A first application and a second application may both be a high priority application and a third application may be a low priority application. The first and second applications may be each allocated thirteen shares of the surplus of resources and the third application may be allocated four shares of the surplus of resources.

At 606, the one or more applications are scaled based on the allocated surplus of resources. In some embodiments, the virtualization resource units associated with the one or more applications are scaled to a multiple of the resource ratio that is permitted with the allocated surplus of resources. In some embodiments, the multiple of the resource ratio is the maximum multiple of the resource ratio that is permitted with the allocated surplus of resources. In other embodiments, the multiple of the resource ratio is a multiple that is less than the maximum multiple of the resource ratio that is permitted with the allocated surplus of resources and greater than the default resource ratio.

Figure 7:
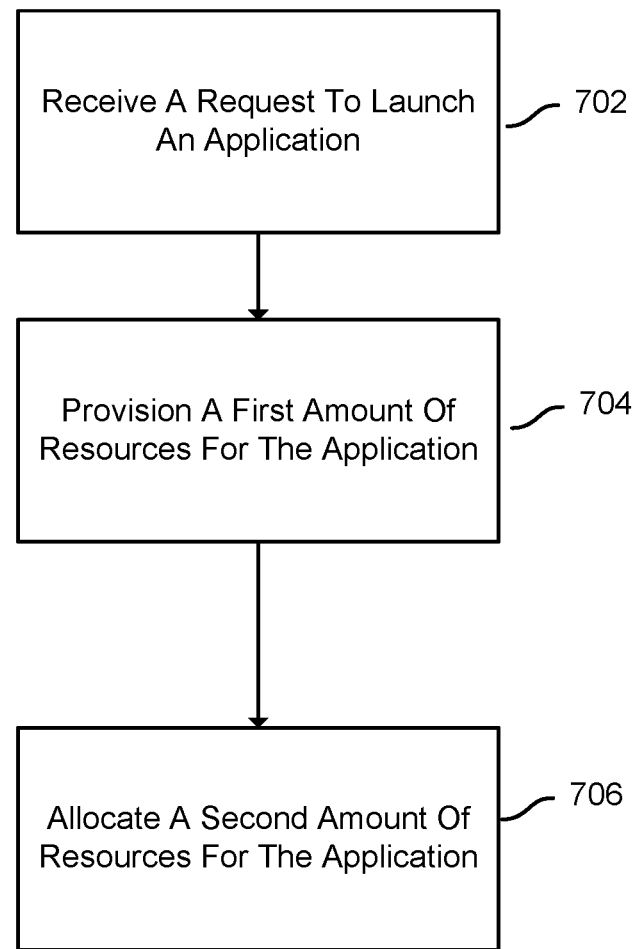
FIG. 7 is a flow chart illustrating a process for scaling an application in accordance with some embodiments.

FIG. 7 is a flow chart illustrating a process for scaling an application in accordance with some embodiments. In the example shown, process 700 may be implemented by a data storage system, such as data storage system 112. Process 700 may be implemented to perform some or all of 306 of process 300. In some embodiments, the application is comprised of one or more layers where each layer is comprised of one or more virtualization resource units. In some embodiments, a virtualization resource unit is a virtualization container. In some embodiments, a virtualization resource unit is a virtual machine.

At 702, a request to launch an application is received. The request may be received from a user associated with a data storage system. In some embodiments, the application is scheduled to be performed at a particular point in time. The application may request an initial amount of resources to be used by the application upon launch and may also request a subsequent amount of resources to be reserved for use by the application after launch.

At 704, a first amount of resources is provisioned for the application. The first amount of resources may be the default amount of resources needed to run the application. The first amount of resources may be the minimum amount of resources needed to run the application. In some embodiments, the first amount of resources is the amount of resources needed to meet certain performance metrics for the application. The first amount of resources provisioned for a first application may be different than the first amount of resources provisioned for a second application.

An application may be comprised of a master container or a master virtual machine. The master container or master virtual machine may be configured to control how the application is scaled up or scaled down. The application may be scaled up or scaled down while the application is running.

At 706, a second amount of resources is allocated for the application. The second amount of resources may be allocated for the application upon the application being launched. The application may decide when to use the second amount of resources. The second amount of resources may be used in response to an increase in application load.

In some embodiments, the master container needs one or more additional containers to perform one or more processes associated with the application. Instead of requesting additional resources from the data storage system on an as-needed basis, the master container may use a portion of or the entire second amount of resources to scale up the application to include the one or more additional virtualization containers. In some embodiments, the number of containers is scaled up based on a resource ratio of the application. In some embodiments, the number of containers is not scaled up based on a resource ratio of the application. Instead, the master container decides the number of containers that need to be added to the application. The master container may also scale down the application after the application is scaled up. The freed up resources of the application as a result of the application being scaled down may be reserved for the application for future use.

In some embodiments, the master virtual machine needs one or more additional virtual machines to perform one or more processes associated with the application. Instead of requesting additional resources from the data storage system on an as-needed basis, the master virtual machine may use a portion of or the entire second amount of resources to scale up the application to include one or more additional virtual machines. In some embodiments, the number of virtual machines is scaled up based on a virtual machine ratio of the application. In some embodiments, the number of virtual machines is not scaled up based on a virtual machine ratio of the application. Instead, the master virtual machine decides the number of virtual machines that need to be added to the application. The master virtual machine may also scale down the application after the application is scaled up. The freed up resources of the application as a result of the application being scaled down may be reserved for the application for future use.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a request to launch an application that is comprised of a plurality of layers, wherein each layer of the plurality of layers of the application is comprised of one or more corresponding virtualization resource units, wherein the one or more corresponding virtualization resource units at each of the plurality of layers of the application is expressed as a resource ratio;
   determining that a surplus of resources is available for one or more applications;
   in response to determining that the surplus of resources is available for one or more applications, determining a priority associated with the application; and
   launching a version of the application based on the determined priority associated with the application, wherein the launched version of the application maintains the resource ratio.

2. The method of claim 1, wherein the one or more corresponding virtualization resource units are virtual machines.

3. The method of claim 1, wherein the one or more corresponding virtualization resource units are virtualization containers.

4. The method of claim 1, wherein determining the priority associated with the application includes determining a total amount of resources needed to scale up the application.

5. The method of claim 4, wherein the priority associated with the application is determined to be a low priority in response to determining that the total amount of resources needed to scale up the application is less than a first threshold of system resources.

6. The method of claim 4, wherein the priority associated with the application is determined to be a medium priority in response to determining that the total amount of resources needed to scale up the application is more than a first threshold of system resources and less than a second threshold of system resources.

7. The method of claim 4, wherein the priority associated with the application is determined to be a high priority in response to determining that the total amount of resources needed to scale up the application is more than a first threshold of system resources and more than a second threshold of system resources.

8. The method of claim 1, wherein the priority associated with the application is based on an importance of the application.

9. The method of claim 8, wherein the importance of the application is specified by a user associated with a storage system.

10. The method of claim 1, wherein the priority associated with the application is based on a maximum amount of resources specified for the application.

11. The method of claim 1, wherein launching the version of the application based on the determined priority associated with the application includes selecting the application from a plurality of applications.

12. The method of claim 11, wherein the application is selected based on the priority associated with the application.

13. The method of claim 11, wherein launching the version of the application based on the determined priority associated with the application further includes determining that there are enough resources to scale the application based on the resource ratio associated with the application.

14. The method of claim 11, wherein launching the version of the application based on the determined priority associated with the application further includes determining that there are not enough resources to scale the application based on the resource ratio associated with the application.

15. The method of claim 14, wherein launching the version of the application based on the determined priority associated with the application further includes:
selecting a different application from the plurality of applications; and
scaling the different application based on a second resource ratio associated with the second application.

16. A computer program product embodied in a non-transitory computer readable medium and comprising computer instructions for:
receiving a request to launch an application that is comprised of a plurality of layers, wherein each layer of the plurality of layers of the application is comprised of one or more corresponding virtualization resource units, wherein the one or more corresponding virtualization resource units at each of the plurality of layers of the application is expressed as a resource ratio;
determining that a surplus of resources is available for one or more applications;
in response to determining that the surplus of resources is available for one or more applications, determining a priority associated with the application; and
launching a version of the application based on the determined priority associated with the application, wherein the launched version of the application maintains the resource ratio.

17. The computer program product of claim 16, wherein determining the priority associated with the application includes determining a total amount of resources needed to scale up the application.

18. The computer program product of claim 16, wherein launching the version of the application based on the determined priority associated with the application includes selecting the application from a plurality of applications.

19. The computer program product of claim 18, wherein launching the version of the application based on the determined priority associated with the application further includes determining that there are enough resources to scale the application based on the resource ratio associated with the application.

20. A system, comprising:
a memory; and
a processor coupled to the memory, wherein the processor is configured to:
receive a request to launch an application that is comprised of a plurality of layers, wherein each layer of the plurality of layers of the application is comprised of one or more corresponding virtualization resource units, wherein the one or more corresponding virtualization resource units at each of the plurality of layers of the application is expressed as a resource ratio;
determine that a surplus of resources is available for one or more applications;
in response to determining that the surplus of resources is available for one or more applications, determine a priority associated with the application; and
launch a version of the application based on the determined priority associated with the application, wherein the launched version of the application maintains the resource ratio.

* * * * *